(12) United States Patent
Fett et al.

(10) Patent No.: US 6,830,096 B1
(45) Date of Patent: Dec. 14, 2004

(54) HEAT PIPE FOR DIFFERENTIAL ASSEMBLY

(75) Inventors: Gregory Allen Fett, Ft. Wayne, IN (US); Timothy William Runstadler, Saline, MI (US); David Allen Krueger, Fort Wayne, IN (US); Michael L. Dougherty, Rochester Hills, MI (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/143,752

(22) Filed: May 14, 2002

(51) Int. Cl.⁷ .......................... F28D 15/00; F01M 5/00; F28F 15/00; F16H 57/04; B60K 17/16
(52) U.S. Cl. .......................... 165/41; 165/47; 165/916; 165/104.21; 184/6.22; 184/6.12; 184/104.1; 184/104.3; 74/606 A; 74/467
(58) Field of Search .................. 165/47, 41, 104.21, 165/51; 74/606 A, 606 R, 467; 184/6.12, 6.22, 104.1, 104.2, 104.3

(56) References Cited

U.S. PATENT DOCUMENTS

| | | | |
|---|---|---|---|
| 837,499 A | | 12/1906 | Perkins et al. |
| 3,143,592 A | | 8/1964 | August |
| 3,564,727 A | | 2/1971 | Fraser |
| 3,715,932 A | * | 2/1973 | Sharp |
| 3,884,293 A | * | 5/1975 | Pessolano et al. ............ 165/51 |
| 4,271,681 A | * | 6/1981 | Schertz .................. 165/104.14 |
| 4,393,922 A | * | 7/1983 | Bahrle et al. .................. 165/41 |
| 4,773,473 A | | 9/1988 | Konitzer |
| 5,220,978 A | * | 6/1993 | McMaster ................. 184/104.1 |
| 5,316,106 A | * | 5/1994 | Baedke et al. ............ 74/606 A |
| 5,540,300 A | * | 7/1996 | Downs et al. ............ 74/606 A |
| 6,036,615 A | | 3/2000 | Young et al. |
| 6,474,405 B1 | * | 11/2002 | Bell et al. ...................... 165/41 |
| 6,499,565 B1 | * | 12/2002 | Coyle et al. .............. 74/606 A |

FOREIGN PATENT DOCUMENTS

| | | | |
|---|---|---|---|
| DE | 2524961 | * | 12/1976 |
| DE | 3223496 | * | 7/1983 |
| DE | 3425110 | * | 1/1986 |
| DE | 4010333 | * | 10/1990 |
| JP | 55-147128 | * | 11/1980 |
| JP | 56-138689 | * | 10/1981 |
| JP | 4-50512 | * | 2/1992 |

* cited by examiner

Primary Examiner—John K. Ford
(74) Attorney, Agent, or Firm—Liniak, Berenato & White

(57) ABSTRACT

An apparatus to regulate and control the temperature of an axle assembly for a vehicle. A heat pipe is inserted though the axle housing cover, the heat pipe travels the length of the cover. Near the lower region of the carrier and beneath the lubricating fluid level, the heat pipe bends to continue in the horizontal direction. Disposed about the terminal end of the heat pipe below the lubricating fluid line are a series of cooling fins. Heat generated within the lubricating fluid that is heated during operation conduit is dissipated via the cooling fins.

13 Claims, 3 Drawing Sheets

US 6,830,096 B1

HEAT PIPE FOR DIFFERENTIAL ASSEMBLY

BACKGROUND OF THE INVENTION

1. Field of the Invention

The present invention relates to a differential assembly that is lubricated to prevent excessive heat buildup. More specifically the present invention relates to an apparatus that removes heat from the axle assembly or torque transmission device.

2. Description of Related Art

Typically axles are lubricated by a reservoir of oil in the sump which is circulated by the moving components. This is known as splash lubrication. The operating temperature of a splash lubricated axle assembly or other torque transmission device is generally dependent on the torque being transmitted, the ambient temperature, the speed of rotation and airflow over the device.

The operating temperature can be just above the ambient temperature to more than 200 degrees F above ambient. Operating temperatures significantly above 250 degrees F can begin to cause problems with the durability of the components in the axle as well as the lubricant itself. These temperatures are generally encountered at higher speeds and/or torques such as high speed highway driving or trailer towing. Therefore it is desirable to avoid these higher temperatures as much as possible. It is the intention of the present invention to minimize these high operating temperatures.

It is known to provide cooling conduits within an axle assembly in order to avoid high operating temperatures. These conduits are positioned about a majority of the differential assembly and contain a hydraulic fluid from another device which is capable of cooling the lubricant in the axle.

It is also known to have a differential assembly with a heat pipe having heat absorbing portions extending through an oil sump as well as externally disposed heat transmitting devices.

Additionally, it is know to have a heat pipe including a closed tube having a heat exchange medium comprised of a plurality of fins.

Thus, the aim underlying the present invention lies in providing an effective fluid lubricant cooling area that is readily utilizable, without significantly increasing the costs of production, the required space, and weight.

SUMMARY OF THE INVENTION

It is therefore an object of the present invention to provide temperature regulating apparatus for a differential assembly. The present invention will provide a cooling mechanism for a differential assembly through a heat pipe having cooling fins disposed thereon. One of the heat pipes is inserted through the carrier cover and is situated within the lubricating fluid reservoir in the bottom of the carrier. The heat pipe assembly extends horizontally through an axle lubricant, the heat pipe extends in a vertical direction within the differential carrier then passes from an interior of the carrier to an external ambient environment, the heat pipe extends along an axle tube projecting from the carrier.

Another heat pipe is inserted into the differential assembly via the pinion extension. Cooling fins are situated on the terminal end of the heat pipe section situated outside the pinion assembly.

The present invention provides a cooling means for fluid splashed within the differential assembly or other similar torque transmission device in order to reduce or eliminate higher portion of the normal operating temperature range to maximize efficiency.

The advantageous features of the present invention include cooling of lubricating fluid through use of at least one heat pipe with a heat absorbing portion of the heat pipe exposed to the lubricating fluid and the heat transmitting element exposed to the external environment. The cooling fins inside an axle assembly are designed to absorb heat generated while the cooling fins located in the external environment dissipate the same heat in order to cool the entire assembly.

These advantages and other novel features of the present invention will become apparent in the following detailed description of the invention when considered in conjunction with the accompanying drawings.

BRIEF DESCRIPTIONS OF THE DRAWINGS

A better understanding of the present invention will be had when reference is made to the accompanying drawings, wherein identical parts are identified by identical reference numbers and wherein.

DETAILED DESCRIPTION OF THE PRESENT INVENTION

The features of the invention as explained above provide a temperature regulating apparatus (i.e., cooling means) for an axle assembly 10.

Figure 1:
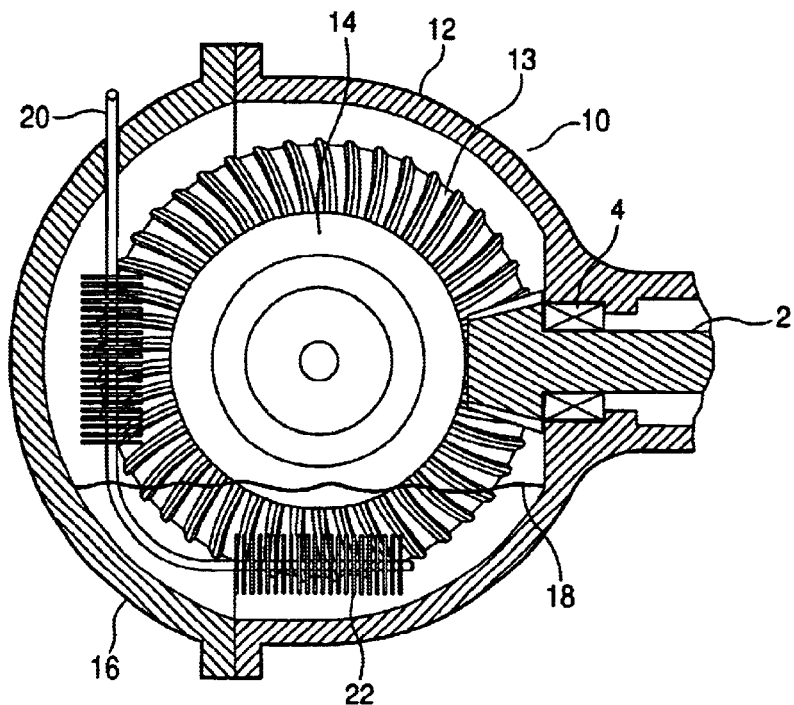
FIG. 1 is a side profile of an axle carrier and the present invention.

Referring to FIG. 1, a differential assembly 14 is disposed with in an axle carrier 12. The axle carrier 12 is open in the rear and has a corresponding cover 16 for sealing the assembly 10. The carrier 12 houses a pinion shaft 2 that defines an axial direction. The pinion shaft 2 drivingly engages a ring gear 13 of the differential assembly.

Vehicle torque transmitting devices, such as axle assemblies, require lubricating fluid 18 in order to allow the moving gears within the assemblies to properly function. Temperature of lubricating fluid 18 within the axle assembly 10 varies depending upon several conditions, including but not limited to ambient temperature, speed, torque, etc. During initial driving conditions of the vehicle and operation under high speeds, the axle assembly 20 is relatively hot which results in inefficient operation. The lubricating fluid 18 is heated by friction supplied from the moving gears. When the vehicle is operating at high speeds, the friction between gearing in the axle assembly 20 generates significant heat. It has been discovered that maintaining the lubricating fluid 37 within a temperature range between 150–250 degrees Fahrenheit produces the most efficient results from the axle assembly 20, e.g., longevity of components. The ideal operating temperature for an axle assembly is around 200 degrees Fahrenheit.

During driving conditions when heat builds up in the axle assembly 10, heat is removed from the axle assembly 10 by a heat pipe 20 located therein.

Figure 2:
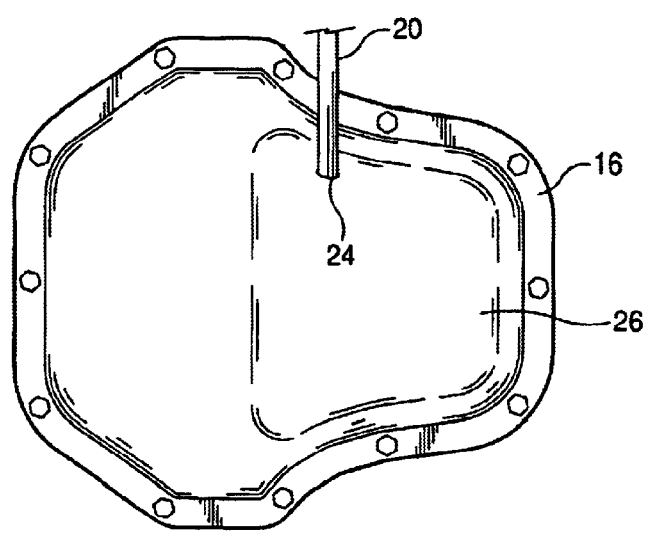
FIG. 2 is a front view of an axle assembly cover.

A heat pipe 20 is situated through an opening 24 (shown in FIG. 2) in the axle carrier cover 16. The heat pipe 20 has a terminal end situated in an external environment located on the outside of the carrier assembly 10. Upon passing through cover 16, the heat pipe 20 travels along the inside surface of the cover 16 toward the lubricating 18 pool in the bottom of the carrier 12. At this point, the heat pipe 20 has approximately a 90 degree angle, so that the heat pipe 20 continues toward the front of the axel carrier 12 in the axial direction defined by the pinion shaft as seen in FIG. 1.

In order to accommodate the heat pipe 20, the cover 16 has a pocket 26 formed the region of the cover 16 wherein the heat pipe 20 will be located. The pocket 26 can be molded or press fit into any shape necessary to accommodate the heat pipe 20.

Figure 3:
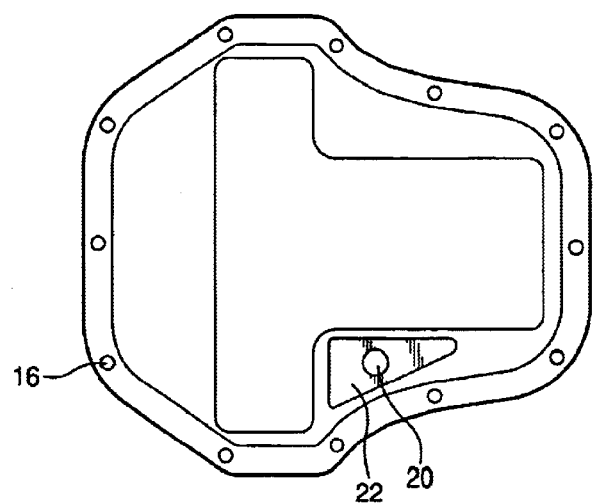
FIG. 3 is a rear view of an open axle assembly with a differential.

Referring back to FIGS. 1 and 2, the heat pipe 20 has a series of cooling fins 22 attached thereon. The fins 22 are disposed around the length of heat pipe 20 traveling along the cover 16 as well as the length of heat pipe 20 situated parallel with the pinion shaft 2. The cooling fins 22 can be any of shape that permits a maximum surface area for cooling the lubricating fluid 18. For example, as seen in FIG. 3, the cooling fins 22 here are triangular in shape. Other shapes included but not limited to are circles, squares, etc.

The cooling fins 22 may be secured to the heat pipe 20 by any means known to those skilled in the art or may also be formed from the heat pipe 20 itself during manufacturing.

Figure 4:
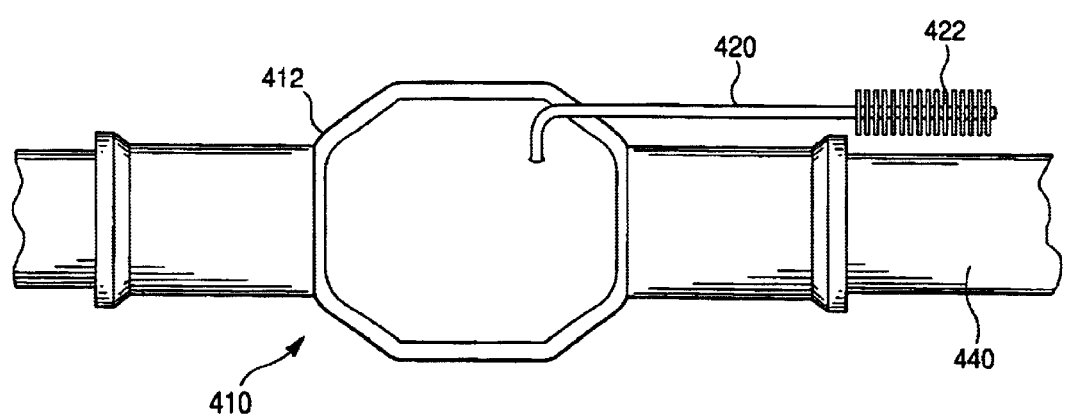
FIG. 4 is a rear view of an axle and an axle assembly coupled with another embodiment of the axle assembly.

In yet another embodiment shown in FIG. 4, the heat pipe 420 is inserted directly into the carrier 412 through a hole in the carrier wall. A fitting as is commonly known to those skilled in the art secures the heat pipe 420 to the carrier 412 creating a seal to prevent loss of lubricating fluid. In this embodiment the heat exchanger which contains the heat pipe 420 and the cooling fins 422 is located outside the axle assembly 410. The axle assembly 410 has a pair of side axles 440 entering the axle carrier 412. While FIG. 4 indicates that the heat pipe 420 is secured to the right side of the carrier 412, it should be appreciated that the heat pipe 420 may also be secured on what appears as the left side in FIG. 4 as well.

Figure 5:
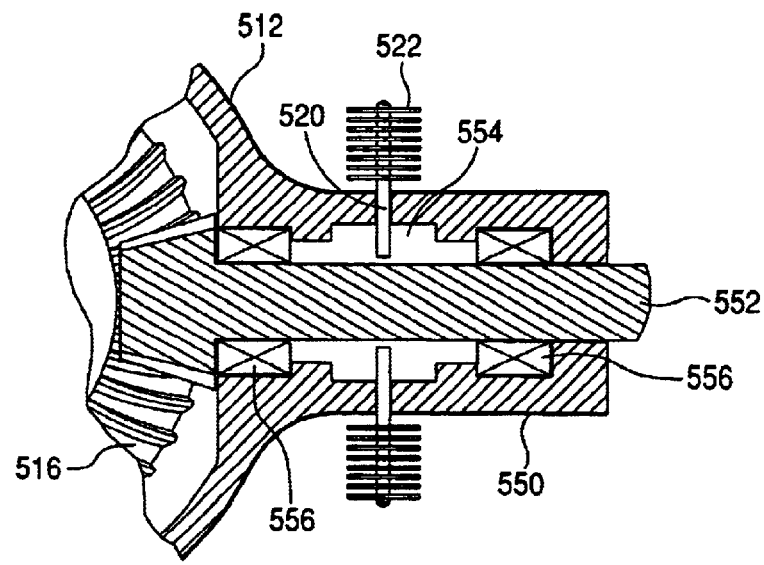
FIG. 5 is a side cross-sectional view of a pinion extension for an axle carrier with another embodiment of the present invention.

In yet another embodiment shown in FIG. 5, the heat pipe 520 is inserted through the pinion extension 550. The pinion extension 550 houses the pinion shaft 552 which engages the ring gear 516 of the differential assembly. The pinion shaft is situated on a plurality of bearing assemblies 556. Between the bearing assemblies lies a cavity 554. The heat pipe 552 is inserted into a passage in the pinion extension 550 and is situated within the cavity 554. The cavity is relatively small; therefore the cooling fins 522 are located outside of the pinion extension 550. Here again, the cooling fins 522 may be formed directly from the heat pipe 520 through a machining process or the entire heat pipe 520, including cooling fins 522, may be formed from several elements.

Figure 6:
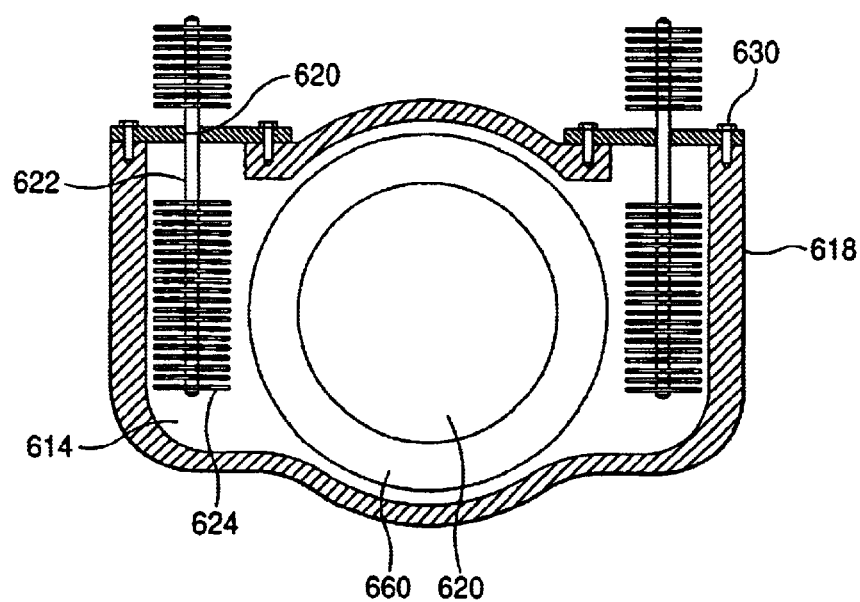
FIG. 6 is a front cross-sectional view of a pinion extension with another embodiment of the present invention.

In yet another embodiment shown in FIG. 6, the axle carrier 612 is adapted to include optional cavities 614. The axle carrier 612 is fit to receive a supplemental carrier 618 that fits over the pinion 620 and the pinion bearing 660. The axle carrier 612 has a plurality of bolts fit to secure the supplemental carrier 618. The optional cavities 614 are located perpendicular to the axial direction of the pinion shaft 620. The supplemental carrier 618 may be connected to the axle carrier 612 with bolts 630. It should be appreciated by others skilled in the art that other means may be used to secure the supplemental carrier 618 to the axel carrier 612 such as welding. Located in the supplemental carrier 618 are holes 630 for inserting a heat pipe 622. The heat pipe 622 extends both inside the cavity 614 as well as outside in an external environment. Located on both ends of the heat pipe 622 are cooling fins 624. Here again, as with other embodiments, the shape of the fins 624 may vary depending the dimensions of the cavity 614 and the external environment around the axle carrier 612.

While the foregoing invention has been shown and described with reference to several preferred embodiments, it will be understood that various changes in form and detail may be made without departing from the spirit and scope of the present invention.

What is claimed is:

1. A differential assembly, comprising:
   a differential carrier;
   a differential case rotatably supported within said differential carrier, said case enclosing a differential gear assembly driven by a pinion shaft and allowing differential rotational speed between a pair of opposing output axle shafts projecting from said differential case;
   a heat pipe extending horizontally through an axle lubricant, said heat pipe extending in a vertical direction within said differential carrier then passing from an interior of said carrier to an external ambient environment, said heat pipe extending along an axle tube projecting from said carrier,
   wherein said heat pipe increases a dissipation of heat from said axle lubricant.

2. The assembly according to claim 1, wherein said heat pipe includes a plurality of cooling fins disposed thereon.

3. The device as defined in claim 2, wherein said fins are generally circular in shape.

4. The device as defined in claim 2, wherein said plurality of cooling fins is formed from said heat pipe.

5. The device as defined in claim 2, wherein said plurality of cooling fins is attached to said heat pipe.

6. The device as defined in claim 1, wherein said heat pipe has a terminal end within said housing and is immersed in said lubricant.

7. The device as defined in claim 1, wherein a cover for said differential carrier has a recess formed along a surface thereof to accommodate said heat pipe.

8. The differential axle assembly according to claim 1, wherein said heat pipe extending in said vertical direction is disposed in a rear portion of said differential carrier, said heat pipe extending in said horizontal direction extends towards a front portion of said differential carrier in a direction parallel to an axial direction of said pinion shaft.

9. The differential axle assembly according to claim 1, said differential gear including a ring connected to said differential case and engageably driven by said pinion shaft, said heat pipe having cooling fins connected to said heat pipe extending in said horizontal direction, said cooling fins being disposed within and substantially occupying a spaced defined by boundaries between said ring gear said differential case and said carrier; wherein said cooling fins are triangular shaped thereby maximizing an exposed surface area within said space.

10. A differential assembly, comprising:
    a differential carrier;
    a differential case rotatably supported within said differential carrier, said case enclosing a differential gear assembly driven by a pinion shaft and allowing differential rotational speed between a pair of opposing output axle shafts projecting from said differential case;

a heat pipe extending horizontally through an axle lubricant, said heat pipe extending in a vertical direction within said differential carrier then passing from an interior of said carrier to an external ambient environment, said heat pipe extending along an axle tube projecting from said carrier,
 wherein said heat pipe increases a dissipation of heat from said axle lubricant;
a first set of cooling fins connected to said heat pipe extending in said horizontal direction and being substantially submersed in a pool of said axle lubricant;
a second set of cooling fins connected to said heat pipe and separated from said first set of cooling fins by an unfinned section and extending in said vertical direction disposed substantially above said pool of said axle lubricant.

11. The differential axle assembly according to claim 10, wherein said heat pipe extending in said horizontal direction extends in a direction parallel to an axial direction of said pinion shaft.

12. The differential axle assembly according to claim 10, wherein said heat pipe extending in said vertical direction is disposed in a rear portion of said differential carrier, said heat pipe extending in said horizontal direction extends towards a front portion of said differential carrier in a direction parallel to an axial direction of said pinion shaft.

13. The differential axle assembly according to claim 11, said differential gear including a ring connected to said differential case and engageably driven by said pinion shaft, said cooling fins being disposed with a spaced defined by boundaries between said ring gear said differential case and said carrier; wherein said cooling fins are triangular shaped and connected to said heat pipe extending in said horizontal direction thereby maximizing an exposed surface area within said space.

* * * * *